Feb. 5, 1924.

E. P. GOODCHILD

MUSIC LEAF TURNER

Filed Dec. 24, 1920

WITNESSES

INVENTOR
E. P. Goodchild,
BY
ATTORNEYS

Feb. 5, 1924. 1,482,682
E. P. GOODCHILD
MUSIC LEAF TURNER
Filed Dec. 24, 1920 3 Sheets-Sheet 2
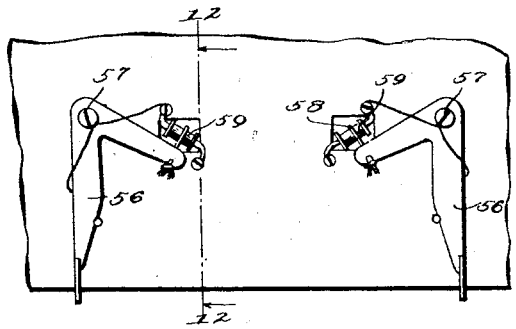
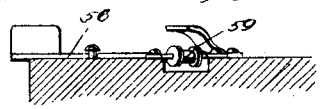
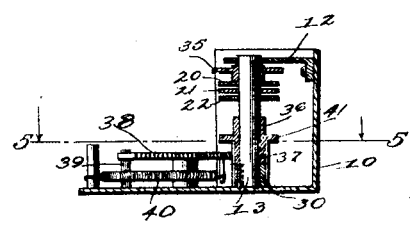
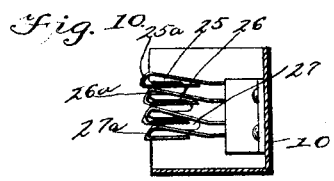
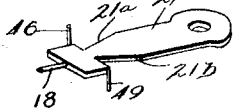
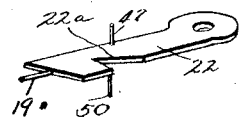
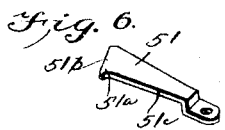
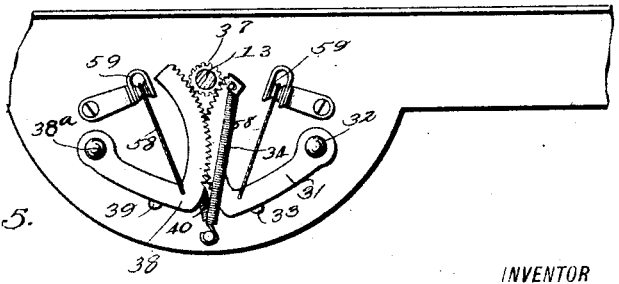
WITNESSES
F. O. Mankin
W. F. Buckley
INVENTOR
E. P. Goodchild,
BY
ATTORNEYS Feb. 5, 1924.  1,482,682
E. P. GOODCHILD
MUSIC LEAF TURNER
Filed Dec. 24, 1920   3 Sheets-Sheet 3
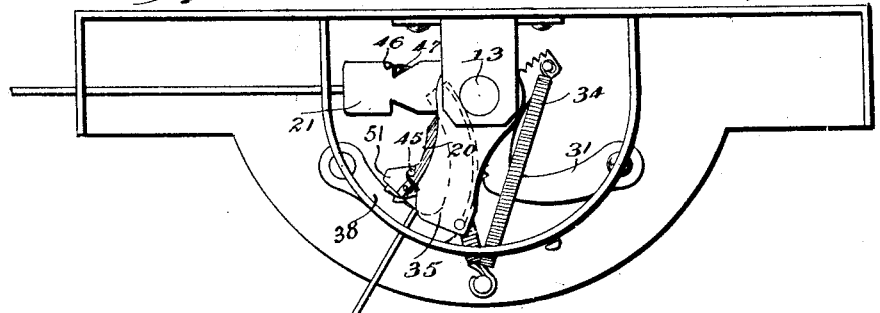
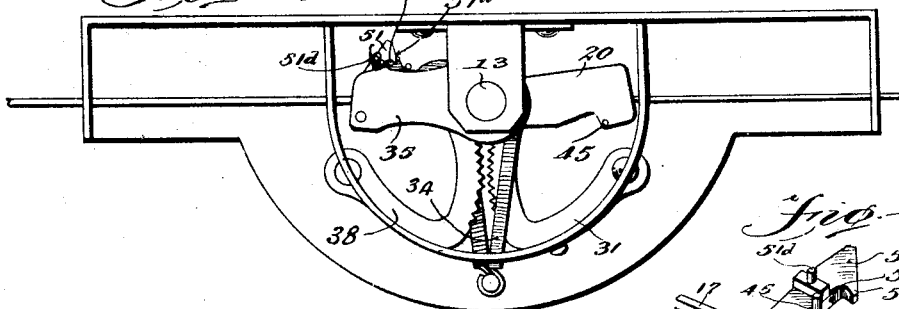
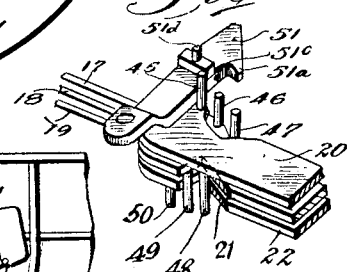
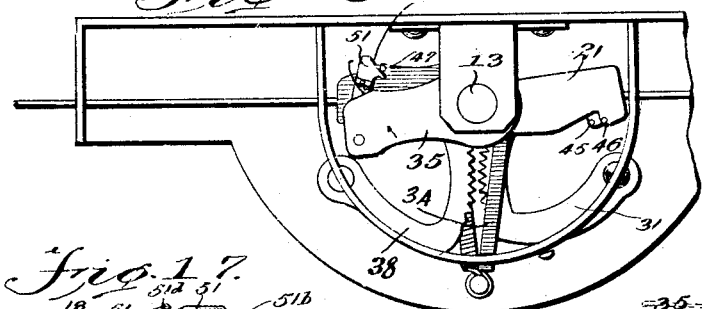
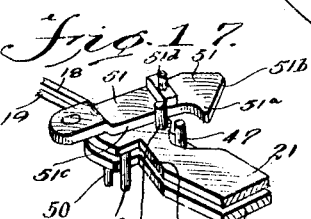
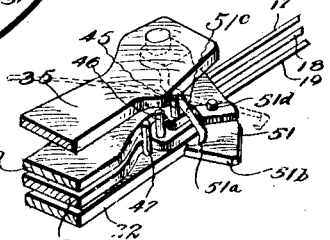
WITNESSES
INVENTOR
E. P. Goodchild,
BY
ATTORNEYS Patented Feb. 5, 1924.

1,482,682

UNITED STATES PATENT OFFICE.

EUCLID P. GOODCHILD, OF SPOKANE, WASHINGTON.

MUSIC-LEAF TURNER.

Application filed December 24, 1920. Serial No. 433,013.

*To all whom it may concern:*

Be it known that I, EUCLID P. GOODCHILD, a citizen of the United States, and a resident of Spokane, in the county of Spokane and State of Washington, have invented certain new and useful Improvements in Music-Leaf Turners, of which the following is a specification.

The present invention relates to music leaf turners, and has for its object to provide a device of this character which is adapted to quickly and efficiently turn the leaves of the music in either direction, which is so organized as to provide for the turning of successive leaves by an extremely simple and uniform controlling action on the part of the operator and which is of simple and durable construction, reliable in operation and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 4 is a detail view in transverse vertical section of the actuator;

Figure 5 is a similar view in transverse horizontal section on line 5—5 of Figure 4;

Figure 6 is a detail perspective view of the pawl of the actuator;

Figures 7, 8 and 9 are detail perspective views of the transfer bars;

Figure 10 is a detail view in side elevation of the retaining slots and associated guides for the leaf-clip carrying arms;

Figure 11 is a detail view in bottom plan of the knee or hand control; and

Figure 12 is a similar view in section on line 12—12 of Figure 11.

Figures 13 and 14 are diagrammatic views in plan, illustrating the coaction between the hook of the pawl of the driving arm and the pins of the transfer bar;

Figure 15 is a similar view, illustrating the coaction between the incline of the nose or forward portion of the pawl and one of the pins of the transfer bars;

Figures 16 and 17 are fragmentary perspective views illustrating the action of the inclined or camming surface of the pawl of the driving arm in guiding or camming the hook into engagement with the proper pin of the transfer bars;

Figure 18 is a similar view, showing a fragment of the driving arm and illustrating the assembly of the pawl and spring therewith and the relation of these parts to the transfer bars and their pins; and Figure 19 is a detail perspective view of the driving arm and the spring actuated pawl carried thereby.

Figure 1:
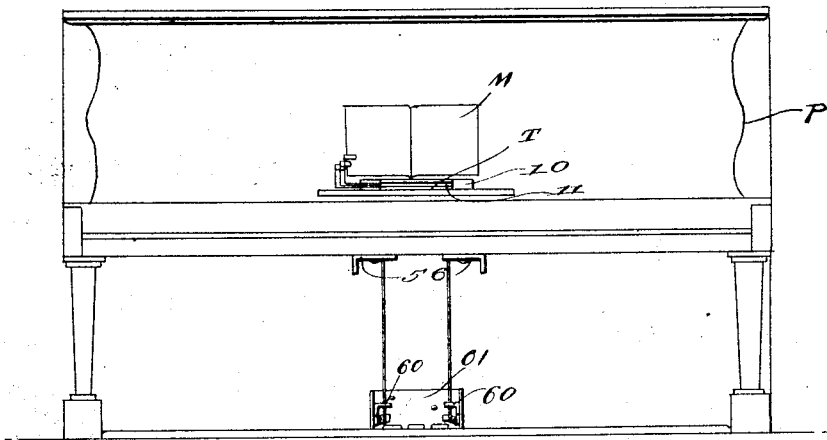
Figure 1 is a front elevation view, illustrating the invention applied to a piano.
Figure 2:
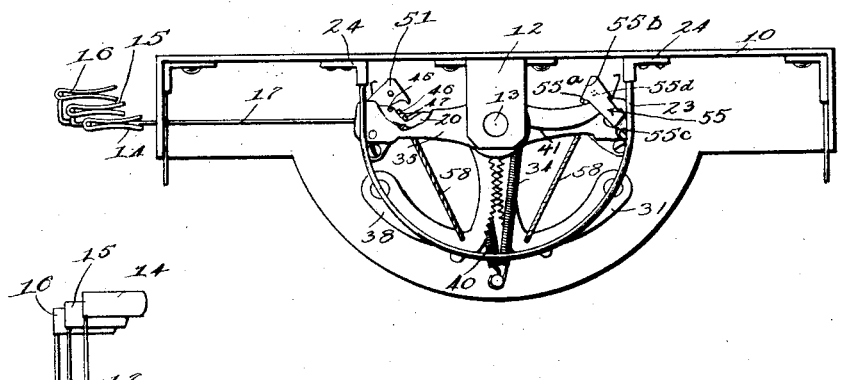
Figure 2 is a detail view in plan of the actuating mechanism for the leaf-clip carrying arms, portions of the casings being removed and parts being broken away for the sake of illustration.
Figure 3:
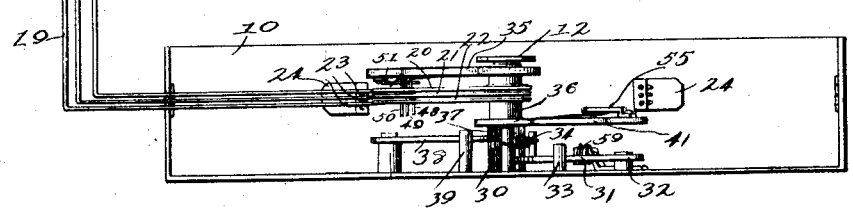
Figure 3 is a similar view in front elevation.

Referring to the drawings wherein for the sake of illustration is shown the preferred embodiment of the invention P designates a piano or like musical instrument with which the invention is adapted to be associated. As usual the front board of the piano constitutes the music stand, and in this connection it is to be understood that the invention can also be used with music stands. The music, designated at M, which comprises as usual a plurality of leaves is arranged upon the front board of the piano, and the invention, designated generally at T is arranged below the music, as shown in Figure 1.

The invention includes a casing 10 having in its front walls a plurality of horizontal transverse slots 11. A bracket 12 is arranged in the casing, and a shaft 13 has one end rotably journaled in the bracket 12 and has its other end rotatably journaled in a bearing provided therefor in the casing 10. The axis of the shaft 13 is preferably alined with the line of fold of the leaves of the music for a purpose to be hereinafter more fully described.

A plurality of leaf-clips designated at 14, 15 and 16 are provided, and are adapted to engage successive or adjacent leaves of music. These clips are preferably of resilient material so as to frictionally grip the leaves. Arms 17, 18 and 19 carry the clips 14, 15 and 16, respectively, and extend along the bottom and up alongside the leaves of the music. These arms are themselves carried by transfer bars 20, 21 and 22, respectively, which are rotatably mounted upon the shaft 13. The arms 17, 18 and 19 are maintained in proper spaced relation and are supported in proper position during movement by means of horizontally arranged and curved support rods 23 which are carried by brackets 24 fixed to the casing 10. As shown in Figure 10, the arms are maintained in terminal position by means of slots 25, 26 and 27, into which they are guided by means of spring guides 25ª, 26ª and 27ª, respectively.

Actuating mechanism is provided, and includes the shaft 13, which as previously set forth also constitutes a bearing for the transfer bars and consequently for the leaf clip carrying arms mounted upon the transfer bars. A driven pinion 30 is fixed to the lower end of the shaft 13 and meshes with a segmental drive gear 31 pivotally arranged upon the casing at 32 and urged or resiliently influenced to initial position against the stop pin 33 by means of a retractile coil spring 34 connected at one end to the casing and at the other end to the segmental gear. A driving arm 35 is fixed to the upper end of the shaft 13 whereby it is constrained to rotate therewith. A sleeve 36 is loosely mounted on the shaft 13 and has fixed thereto a second driven pinion 37 meshed with a segmental gear 38 which is pivotally mounted upon the casing as at 38ª, and which is resiliently influenced or urged to initial position against the stop pin 39 by means of a retractile coil spring 40 connected at one end to the casing and at the other end to the segmental gear 38. A second driving arm 41 is fixed to the sleeve 36. It is to be noted that the segmental gears 31 and 38 are adapted to drive the pinions 30 and 37 with which they are respectively meshed in opposite directions whereby the driving arm 35 is moved in a counterclockwise direction from its initial position and a second driving arm 41 is moved in a clockwise direction from its initial position.

Transfer mechanism is employed for transmitting motion of the driving arms to the proper leaf-clip carrying arm and in proper sequence and includes transfer bars 20, 21 and 22 hereinabove described, a series of upwardly extending transfer pins made up of pins 45, 46 and 47 arranged to extend upwardly from the transfer bars 20, 21 and 22, respectively, and a series of downwardly extending transfer pins made up of transfer pins 48, 49 and 50 which depend from or extend downwardly from the opposite sides of the transfer bars 20, 21 and 22. The transfer pins 45, 46 and 47 of the first series are adapted to successively cooperate with a spring actuated pawl 51 pivotally mounted to the under side of the driving arm 35.

The pawl 51 includes a hook 51ª adapted to successively engage the pins 45, 46 and 47 to successively impart the movement of the driving arm 35 to the transfer bars 20, 21 and 22, respectively. In order to guide or cam the hook 51ª first into engagement with the pin 45, next into engagement with the pin 46 and finally into engagement with the pin 47, the pawl 51 is provided with an incline or camming surface 51ᶜ which leads into the bill of the hook 51ª and which is adapted for successive sliding engagement with the pins 45, 46 and 47 in the order named. It is to be understood that this incline or camming surface 51ᶜ comes into action only when the pawl 51 lies behind the pins 45, 46 and 47, that is in the position shown in Figures 2, 16, 17 and 18, other means being provided for guiding the pawl to position behind these pins as will be presently described. The action of this incline or camming surface 51ᶜ is shown to advantage in Figures 16, 17 and 18 and it is obvious that were it not for this incline surface the hook of the pawl would be liable to engage any one or more of the pins 45, 46 and 47 and would not be constrained to engage the proper pin at the proper time as it is by virtue of the action of the camming surface 51ᶜ.

On the return movement of the driving arm 35 that is when it is returning to position behind the pins 46 and 47 after it has carried the pin 45 and its transfer bar 20 through 180° to turn a leaf or when it is returning to position behind the pin 47 after it has also carried the pin 46 with its transfer bar 21 through 180°, the pawl 51 is automatically cammed or guided to position behind its proper pin by the action of the incline or camming surface 51ᵇ formed at the forward or nose end of the pawl 51 and adapted for successive sliding engagement with the pins 46 and 47 in the final phases of the return movement of the driving arm 31. The action of the incline or camming surface 51ᵇ is shown to advantage in Figure 15 wherein it is slidably engaged with the pin 47. In Figure 14 the hook 51ª of the pawl 51 is shown with its bill engaging the pin 46 at the time when the driving arm 35 is about to impart its movement to the transfer bar 21 through the medium of the pawl 51 and pin 46 and in Figure 13 the hook 51 is shown engaged with the pin 45 during the swinging movement of the driving arm 35 and when this driving arm is carrying the transfer bar 20 through its movement. In Figure 19 the detail construction of the spring actuated pawl is shown to advantage. It is to be noted that the pins 45, 46 and 47 are offset from each other both radially and circumferentially with respect to the axis of swing of the transfer bars and the pins 48, 49 and 50 are similarly offset. This offset of the pins of each series poistions the pins on the transfer bars so that they may be successively engaged by the pawls of the driving arms and this positioning is preferably accomplished by providing a notch 21ª in the transfer bar 21 to receive the pin 47 upstanding from the transfer bar 22 and by forming a notch 20ª on the transfer bar 20 to receive the pin 46 upstanding from the transfer bar 21. The recess 21ª is spaced from the axis of swing of the transfer bar a distance sufficient to just receive the pin 47 and the recess 20ª is spaced from the axis of swing of the transfer bar a distance sufficient to just receive the pin 46, while the pin 45 is spaced from the axis of swing of the transfer bar a greater radial distance than the pin 45 and the recess 20ª. In this manner it is to be noted that while the pins themselves are offset the pins and transfer bars are so nested that in either terminal position, the transfer bars are vertically alined and occupy a minimum of space.

A similar though staggered arrangement is provided for the series constituted by the depending pins 48, 49 and 50 for in this instance the pin 50 is spaced farthest from the axis of swing and the transfer bar 22 is provided with a recess 22ª to receive the pin 49 carried on the transfer bar 21 and the transfer bar 21 is provided with a recess or notch 21ᵇ to receive the pin 48 carried on the transfer bar 20. A stop pin 51ᵈ integrally formed with the pawl 51 limits its movement relative to the driving arm in one direction, the stop pin 51ᵈ engaging the driving arm for this purpose and thus preventing the spring which actuates the pawl from moving it so far as to prevent its incline or camming surface 51ᵈ from engaging the pins 46 and 47 on the return movement of the driving arm as has been previously set forth.

The depending pins 48, 49 and 50 of the second series are adapted to be successively engaged by the spring pressed pawl 55 pivotally connected to the upper side of the driving arm 41 and having a hook 55ª adapted to successively engage the pins, an incline or camming surface 55ᵇ adapted to cam the spring pressed pawl to position behind the pin, an incline surface 55ᶜ adapted to successively cooperate with the pins 50, 49 and 48, respectively to successively transmit or transfer motion of the driving arm thereto. The pawl 55 is provided with a stop pin 55ᵈ which operates in a manner corresponding to the manner in which the stop pin 51ᵈ operates and which for this purpose engages the driving arm to limit the movement of the pawl under the action of the spring relative thereto. It is to be understood that the pawl 55 is identical in construction and operation with the pawl 51 described above and shown in Figures 13 to 19 inclusive and that this pawl is related to and cooperates with the pins 48, 49 and 50 in precisely the same manner as the pawl 51 is related to the pins 45, 46 and 47.

Controlling means is provided, and may be remotely situated, and consists of either manually or knee operated bell crank levers 56 pivoted at 57 to the underside of the piano or other instrument and connected by means of flexible elements 58 such as cords, cables or the like run over guide pulleys 59 with the segmental gears 31 and 38. In lieu of the bell crank levers 56, foot pedals 60 pivoted to the bracket 61 may be provided (see Figure 1) and be connected with the flexible elements whereby the operator may use his feet in exercising control of the leaf turner.

In practice, the leaf clips 14, 15 and 16 are first associated with the leaves of the music and accordingly as it is desired to turn the music to the right or to the left, the arms 17, 18 and 19 and the transfer bars 20, 21, 22 which they carry are positioned on the left or on the right, respectively. When it is desired to turn the leaf or page, the operator depresses the pedals or swings the levers 56 and thus imparts motion to either the segmental gears 38 or 31 to turn the arms 35 or 41. As the driving arm moves from its initial position in the turning of the first page, the incline surface 51ᶜ or 55ᶜ of the pawls engages with the outermost pin and cams the hook of the pawl into engagement with this outermost pin, whereby the motion of the driving arm is transferred to its transfer bar to effect the turning of the page. As soon as the operator releases the foot pedal or lever the retractile coil spring effects a return movement of the driving arm and in the final phase of this return movement the incline surface 51ᵇ or 55ᵇ adjacent the hook cams the pawl to position behind the series of pins where it can be engaged with the next succeeding pin when the operator imparts a controlling movement to the foot pedal or hand lever to effect a turning of the page. This operation may be repeated as often as it is necessary to turn a page.

I claim:

1. A music leaf turner comprising a casing, a vertical shaft rotatably mounted in said casing, a plurality of leaf clips, leaf clip carrying arms extending exteriorly of said casing, a driving arm fixed to said shaft, a sleeve loosely mounted on said shaft, a driving arm fixed to said sleeve, means for rotating the shaft including a pinion fixed to said shaft and a horizontally disposed segmental gear meshed with said pinion, means for rotating the sleeve oppositely with respect to said shaft including a pinion fixed to the sleeve and a horizontally disposed segmental gear meshed with said sleeve pinion, retractile coil springs engageable with said segmental gears for urging said gears to initial position, transfer mechanism for transmitting the motion of said driving arm to the proper leaf clip carrying arm, and controlling means including operating levers and flexible elements connecting said operating levers with said segmental gears.

2. A music leaf turner comprising a casing, a vertical shaft rotatably mounted in said casing, a plurality of leaf clips, leaf clip carrying arms extending exteriorly of said casing, a driving arm fixed to said shaft, a sleeve loosely mounted on said shaft, a driving arm fixed to said sleeve, means for rotating the shaft including a pinion fixed to said shaft and a horizontally disposed segmental gear meshed with said pinion, means for rotating the sleeve oppositely with respect to said shaft including a pinion fixed to the sleeve and a horizontally disposed segmental gear meshed with said sleeve pinion, retractile coil springs engageable with said segmental gears for urging said gears to initial position, and transfer mechanism for transmitting the motion of said driving arm to the proper leaf clip carrying arm.

3. In a music leaf turner, transfer mechanism including a plurality of pivoted transfer bars, a series of upstanding pins comprising a pin carried by each of said transfer bars and offset from the other pins circumferentially and radially with respect to the axis of swing thereof, a series of depending pins staggered with respect to the upstanding series and comprising a pin carried by each of said transfer bars and offset from the other pins circumferentially and radially, said transfer bars being provided with recesses adapted to accommodate the pins of each series in either terminal position whereby the transfer bars may be vertically alined, a driving arm including a pawl having a hook and inclined surfaces cooperable with the pins of the upstanding series and a second driving arm having a hook and inclined surfaces cooperable with the pins of the depending series.

4. In a music leaf turner, transfer mechanism including a plurality of pivoted tranfer bars, a series of upstanding pins comprising a pin carried by each of said transfer bars and offset from the other pins circumferentially and radially with respect to the axis of swing thereof, a series of depending pins staggered with respect to the upstanding series and comprising a pin carried by each of said transfer bars and offset from the other pins circumferentially and radially, a driving arm including a pawl having a hook and inclined surfaces cooperable with the pins of the upstanding series, and a second driving arm having a hook and inclined surfaces cooperable with the pins of the depending series.

5. In a music leaf turner, transfer mechanism including a plurality of pivoted transfer bars, a series of pins comprising a pin carried by each of said transfer bars and offset from the other pins circumferentially and radially with respect to the axis of swing of said transfer bar, said transfer bars being provided with recesses accommodating the pins so that the transfer bars may be vertically alined, and a driving arm including a pawl having a hook and inclined surfaces cooperable with the pins.

EUCLID P. GOODCHILD.